(12) United States Patent
Lui et al.

(10) Patent No.: US 6,250,097 B1
(45) Date of Patent: Jun. 26, 2001

(54) DUAL EXPANSION ENERGY RECOVERY (DEER) AIR CYCLE SYSTEM WITH MID PRESSURE WATER SEPARATION

(75) Inventors: Clarence Lui, Diamond Bar; Wai-Pak Wong, Cerritos; Richard Meyer, Torrance, all of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/416,713

(22) Filed: Oct. 12, 1999

(51) Int. Cl.$^7$ ........................................... F25D 9/00
(52) U.S. Cl. ................................... 62/402; 62/88
(58) Field of Search ............................. 62/401, 402, 172, 62/88, 87, 86

(56) References Cited

U.S. PATENT DOCUMENTS

| | | | |
|---|---|---|---|
| 4,430,867 | * 2/1984 | Warner | 62/402 |
| 4,535,606 | * 8/1985 | Rannenberg | 62/402 |
| 4,550,573 | * 11/1985 | Rannenberg | 62/172 |
| 5,461,882 | * 10/1995 | Zywiak | 62/401 |
| 5,553,461 | 9/1996 | Hitzigath et al. | 62/150 |

* cited by examiner

Primary Examiner—William Doerrler
(74) Attorney, Agent, or Firm—William J. Zak, Jr. Esq.

(57) ABSTRACT

A liquid-to-air cycle system for conditioning water vapor bearing air and cooling a liquid load comprises an air cycle subsystem and a liquid cycle subsystem. The air cycle subsystem includes a first air-to-air heat exchanger, a reheater downstream of the first air-to-air heat exchanger, a first turbine downstream of the reheater, a first water extractor downstream of the first turbine, a first liquid-to-air heat exchanger downstream of the water extractor, and a second turbine downstream of the first liquid-to-air heat exchanger. Thereby, the second turbine can recover rejected heat from the first liquid-to-air heat exchanger. The liquid cycle subsystem is in heat exchange relationship the air cycle subsystem at the first liquid-to-air heat exchanger such that the first liquid-to-air heat exchanger absorbs the rejected heat from the liquid cycle subsystem.

40 Claims, 1 Drawing Sheet

DUAL EXPANSION ENERGY RECOVERY (DEER) AIR CYCLE SYSTEM WITH MID PRESSURE WATER SEPARATION

BACKGROUND OF THE INVENTION

The present invention generally relates to environmental control systems (ECSs) and air cycle cooling systems (ACCSs). More specifically, the present invention relates to an improved ACCS and improved method of conditioning water vapor bearing compressed air and recovering wasted energy from a liquid load, while reducing the system size and bleed air consumption, and improving water removal efficiency.

ACCSs are used to provide a supply of conditioned air to an enclosure, such as an aircraft cabin and cockpit. In the past, ACCSs have utilized an air-to-air cycle cooling system with an integrated liquid loop. But the liquid loop has been primarily for the purpose of cooling radar or other avionics, not for cooling the air to be conditioned. In such systems, a flow of bleed air is taken from an intermediate or high pressure stage within a jet engine having multi-compression stages. The bleed air has usually been pre-cooled within a primary heat exchanger with heat being rejected to RAM air and then flowed to a compressor. After compression, the air has been routed through a second heat exchanger. Next, the air is typically flowed into an air-to-air reheater heat exchanger and then to an air-to-air condenser heat exchanger. Condensed water vapor is extracted by a water extractor, and then routed and evaporated in the second heat exchanger. A dehumidified air moves from the second heat exchanger to the reheater and into a turbine. An expanded air from the turbine flows through the condenser in the capacity as a coolant medium. When the air flow from the condenser passes through a liquid-to-air heat exchanger, a relatively warmer liquid from a liquid loop is cooled and then used to cool avionics. After the air flow moves through the liquid-to-air heat exchanger, the flow becomes the supply to the cabin.

Although providing advantages, the above conventional ACCS with a liquid loop has also presented disadvantages. For example, the liquid load is typically rejected directly into the cooling air supply. When the liquid load is high, it usually warms the air beyond the desired supply temperature. That means the ACCS will have to be increased in size to accommodate the load. The need for both a condenser and reheater adds bulk to the system. Of course, with fewer components, greater cooling capacity can be achieved with a given amount of space. If the ACCS is used as a retrofit, a bulkier system size means fewer opportunities for the ACCS to fit into different spaces to be retrofitted.

In a specific example of an air cycle system with a liquid cooling loop, U.S. Pat. No. 4,430,867 moves a compressed bleed air moves into a liquid/air condenser. From the liquid/air condenser, the air moves through a water collector and then directly to a turbine. Accordingly, the air into the turbine has not been reheated. From the turbine, an expanded air passes through a first liquid/air heat sink exchanger and then into a cabin. In the liquid loop, a heated liquid moves from the liquid/air condenser for use as ice melting at the upstream face of the first liquid/air heat sink exchanger. The liquid then moves through a second liquid/air heat sink exchanger inside a cabin and back to the liquid/air condenser. Accordingly, the liquid from a liquid load (i.e., the second liquid/air heat sink exchanger) is being used to condense and remove water at the turbine inlet. What is evidently not addressed, at least explicitly, is the problem of recovering heat rejected by the liquid loop.

U.S. Pat. No. 5,906,111 is assigned to the same assignee as the present invention and provides an air cycle subsystem and liquid cycle subsystem. The air cycle provides a compressed air to a liquid-to-air condenser and then a water extractor. A dehumidified air from the water extractor moves into a liquid-to-air reheater, a turbine, and then into first and second liquid-to-air heat exchangers. The air from the second liquid-to-air heat exchanger is used to cool an enclosure. The liquid cycle flows liquid through the first liquid-to-air heat exchanger, the condenser, the reheater, and then the second liquid-to-air heat exchanger. Thereby, the liquid cycle assists in removing water from the air in the air cycle. Although part of the wasted energy from the liquid load is recovered, a higher efficiency might still be achieved.

A variation of the air cycle system shown in U.S. Pat. No. 4,430,867 is U.S. Pat. No. 5,086,622, both of which are by the same inventor. In the latter, bleed air is compressed in a compressor and then flowed to an air-to-air condenser. Upon water vapor being condensed and then extracted, a dehumidified air moves to a first turbine for expansion. A discharge air from the first turbine moves back to the condenser and then to a second turbine. From the second turbine, the air can be supplied to a cabin. In this design, a dehumidified air does not flow through a reheater prior to entering the first turbine. That presents at least one disadvantage since the residual condensed water droplets in the first turbine inlet stream impinge on cold turbine blades and outlet walls and freeze out if the metal temperatures are much below freezing. Ice then quickly accumulates and must be rapidly melted to avoid clogging.

In the air cycle system shown in European Patent no. 248,578 B1, a compressor compresses an air flow which then moves through a coolant heat exchanger. The air then passes through a first turbine and into a first load heat exchanger. Thereafter, the air is ducted into a second turbine and then to a second load heat exchanger. The first and second load heat exchangers heat exchange with heat loads and are cooled by air or other mediums. Omitted from the disclosure, however, is if and how water is extracted from the air. Also omitted is how the loads can be balanced between the two stage turbines such that a practical design can be achieved.

As can be seen, there is a need for an ACCS with a liquid loop that is small in size such that for a given space a greater cooling capacity can be achieved. There is also a need for an ACCS which, due to its relatively small size, can serve as a retrofit in more environments. Further, an ACCS is needed which can more efficiently utilize the bleed air as a cooling medium. Also needed is an environmental control system that allows an ACCS to recover wasted thermal energy from a liquid cycle system. Still another need is for an ACCS that can recover a heat of condensation and sensible cooling.

SUMMARY OF THE INVENTION

In one aspect of the present invention, a method of conditioning water vapor bearing air for supply as conditioned air and cooling a liquid load comprises the steps of providing an air cycle subsystem having a first heat exchanger, a reheater downstream of the first heat exchanger, a first turbine that condenses substantially all of the water vapor and is downstream of the reheater, a second heat exchanger downstream of the first turbine, a second turbine downstream of the reheater, and a third heat exchanger downstream of the second turbine; and placing a liquid cycle subsystem in heat exchange relationship with the air cycle subsystem, the heat exchange relationship occurring at the second and third heat exchangers, whereby the second turbine can convert thermal energy from the liquid cycle subsystem into useful energy.

In another aspect of the invention, a liquid-to-air cycle system for conditioning water vapor bearing air and cooling a liquid load comprises an air cycle subsystem having a first air-to-air heat exchanger, a reheater downstream of the first air-to-air heat exchanger, a first turbine downstream of the reheater, a first water extractor downstream of the first turbine, a first liquid-to-air heat exchanger downstream of the water extractor, and a second turbine downstream of the first liquid-to-air heat exchanger such that the second turbine can recover rejected heat from the first liquid-to-air heat exchanger; and a liquid cycle subsystem in heat exchange relationship the air cycle subsystem at the first liquid-to-air heat exchanger such that the first liquid-to-air heat exchanger absorbs the rejected heat from the liquid cycle subsystem.

These and other features, aspects and advantages of the present invention will become better understood with reference to the following drawings, description and claims.

DETAILED DESCRIPTION OF THE INVENTION

Figure 1:
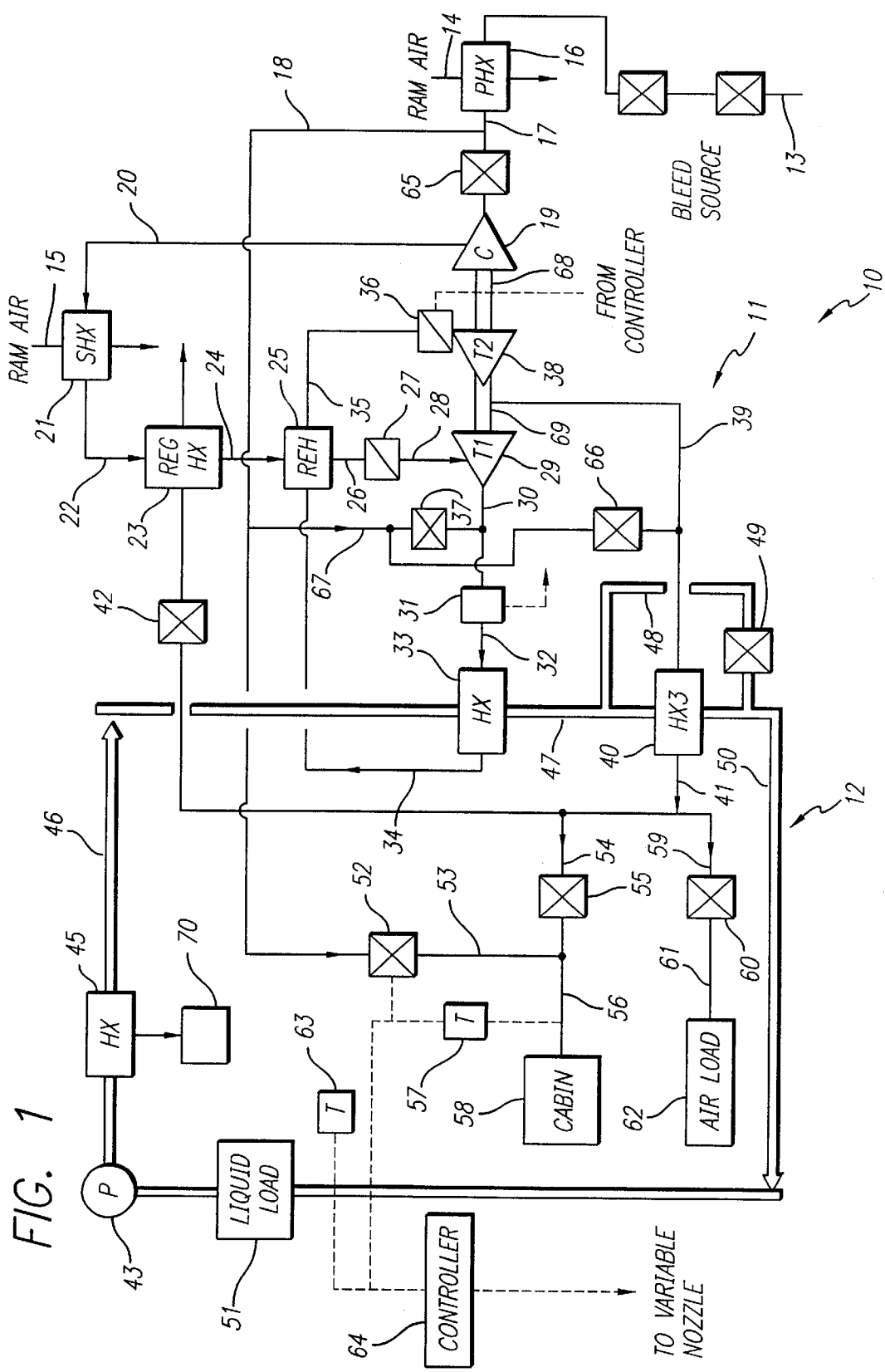
FIG. 1 is a schematic diagram of one embodiment of the present invention.

FIG. 1 schematically depicts a liquid-to-air cycle system or environmental control system (ECS) 10 according to one preferred embodiment of the present invention. The ECS 10 comprises an air cycle subsystem 11 that is in heat exchange relationship with a liquid cycle subsystem 12. More specifically, the air cycle subsystem 11 includes a primary heat exchanger 16, a compressor 19, a secondary heat exchanger 21, a first heat exchanger 23, a reheater 25, a first turbine 29, a water extractor 31, a second heat exchanger 33, a second turbine 38, and a third heat exchanger 40. The liquid cycle subsystem 12 includes components that also function as part of the air cycle subsystem 11. The liquid cycle subsystem 12 includes the second and third heat exchangers 33, 40, as well as a pump 43 and a fourth heat exchanger 45. Through the shared components, a heat exchange relationship is established between the subsystems 11, 12.

If the selected environment for the present invention is an aircraft, the water vapor bearing air may be a bleed air 13 from a turbine engine of the aircraft. The bleed air 13 flows through the air cycle subsystem 11 while water vapor is substantially all condensed by the first turbine 29 and then the condensed water vapor is extracted by the water extractor 31. The air flow is then reheated in the reheater 25 and expanded by the second turbine 38. The flow from the second turbine 38 passes through the third heat exchanger 40 for eventual supply to a cabin 58 and/or other air load 62. The liquid cycle subsystem 12 circulates a liquid coolant through the fourth heat exchanger 45, the second heat exchanger 33, and then the third heat exchanger 40. Thereby, the bleed air 13 is conditioned for eventual supply to an enclosure, the liquid cycle subsystem 12 can cool a liquid load 51, and the thermal energy from the liquid cycle subsystem 12 can be recovered by the air cycle subsystem 11, specifically, by the second turbine 38.

In more particularly describing the present invention, and as shown in FIG. 1, the bleed air 13 is sent through the primary heat exchanger 16 such that the bleed air 13 is in heat exchange relationship with a RAM or ambient air 14. After the bleed air 13 is cooled in the primary heat exchanger 16, a resulting pre-cooled air exits through a duct 17 and passes either through a flow control valve 65 or through a duct 18. If the pre-cooled air moves through the duct 18, the air is routed either through a temperature control valve 52 or another temperature control valve 66, both of which eventually route air to the cabin 58 and/or air load 62, as further described below. On the other hand, if the pre-cooled air from the primary heat exchanger 16 moves through the flow control valve 65, the air passes into the compressor 19 where the air is compressed to a high pressure. A compressed air exits the compressor 19 through a duct 20 and enters the secondary heat exchanger 21 whereby further cooling of the compressed air occurs by heat exchange with a RAM air 15. A compressed or high pressure, water vapor bearing air exits the secondary heat exchanger 21 and flows through a duct 22.

The first heat exchanger 23, which is an air-to-air exchanger, receives the water vapor bearing air from the duct 22. The first heat exchanger 23 places such air in heat exchange relationship with a discharge air from the second turbine 38, which is more fully described below. By such heat exchange process, the water vapor bearing air is cooled. The cooled water vapor bearing air then moves through a duct 24 and into the reheater 25 where the air is further cooled and water vapor is partly condensed by a heat exchange process with the outlet air from the second heat exchanger 33, as further described below. From the reheater 25, a further cooled water vapor bearing air exits through a duct 26 and into an optionally provided water extractor 27. While not needed, the water extractor 27 may be used to remove the partly condensed water vapor. A duct 28 allows the air to then flow into the first turbine 29.

The first turbine 29 condenses substantially all of the water vapor in the water vapor bearing air as a result of the air being expanded and thus cooled. However, in this preferred embodiment, the discharge pressure from the first turbine 29 is maintained at a discharge temperature above freezing (or, in other words, a mid-pressure) so that the need for a large condenser upstream of the turbine 29 is eliminated. Such a condenser is needed, for example, in U.S. Pat. No. 5,086,622. A duct 30 moves a first expanded and water condensed air from the first turbine 29 to another water extractor 31 that extracts substantially all of the condensed water from the water condensed air to provide a dehumidified air. It is contemplated that about 90% of the total condensed water is extracted, although the amount can vary depending upon optimization. In this embodiment, the extracted water can be flowed via a duct (not shown) to the secondary heat exchanger 21 for evaporation. The dehumidified air from the water extractor 31 then flows through a duct 32 and into the second heat exchanger 33, which is a liquid-to-air heat exchanger.

In the second heat exchanger 33, the dehumidified air is placed in heat exchange relationship with the liquid cycle subsystem 12 which now carries rejected heat or wasted thermal energy from the liquid load 51. Because of the heat exchange relationship, the second heat exchanger 33 not only heats the dehumidified air, but it also absorbs the wasted thermal energy from the liquid cycle subsystem 12. That is unlike past systems that reject heat from a liquid load and into a supply and, thus, allow no recovery. Again, while dependent upon optimization, the present invention contemplates that the amount of recovered thermal energy by the second heat exchanger 33 is about 60% of the total energy available for recovery in the second heat exchanger 33. The recovery in the second heat exchanger 33 occurs in a fashion whereby the recovered heat can eventually be transformed into useful work or energy.

In this embodiment, the recovered energy is used to increase energy input to the second turbine 38 and results in higher compression by the compressor 19, as further described below. As can be appreciated by those skilled in the art, the amount of recovery of the heat from the liquid cycle subsystem 12 within the second heat exchanger 33 is at least partial, with the remainder going to the supply for the cabin 58 and/or the air load 62. The amount of recovery is dependent upon the aircraft flight conditions and the particular liquid load 51, with higher ambient air temperatures decreasing the amount of recovery. Irrespective of the amount of recovery, the second heat exchanger 33 produces from the dehumidified air a heated air.

The heated air exits the second heat exchanger 33 through a duct 34 and then flows back to the reheater 25. In the reheater 25, the heated air serves as the coolant medium to cool the incoming water vapor bearing air. From the reheater 25, a reheated air exits through a duct 35 and enters an optionally provided variable nozzle 36 that can control the amount of flow (i.e., pressure) into the second turbine 38. The variable nozzle is an integral part of the air cycle machine design. The reheated air exits the nozzle 36 and expands in the second turbine 38 that is mechanically engaged to the first turbine 29 through a shaft 69. The second turbine 38 not only expands the reheated air but it also recovers some of the rejected heat from the liquid cycle subsystem 12 that was absorbed by the second heat exchanger 33. Additionally, the second turbine 38 recovers some of the heat of condensation and sensible cooling rejected into the reheated air by the reheater 25.

The recovered heat from both the second heat exchanger 33 and the reheater 25 can be used by the second turbine 38, for example, to increase its rotating speed, boost its pressure ratio, and increase the expansion of the reheated air. Further, and as seen in FIG. 1, the second turbine 38 is mechanically engaged to the compressor 19 by means of a shaft 68. Thus, heat or energy absorbed by the second turbine 38 can be converted to useful energy by the compressor 19. Consequently, the consumption of the bleed air 13 by the system 10 is reduced in comparison to what would otherwise be needed in the absence of the two-stage expansion technique of the present invention.

When the second turbine 38 expands the reheated air, a second expanded air is produced which flows out the turbine 38 through a duct 39. Next, the second expanded air flows through the third heat exchanger 40, which is a liquid-to-air heat exchanger, whereby the second expanded air is warmed therein as a result of the heat exchange relationship between the second expanded air and the liquid cycle subsystem 12. A warmed, expanded air exits the third heat exchanger 40 through a duct 41. From the duct 41, the air can move into a duct 59, a duct 54, or a regenerative valve 42. Through the duct 59, the flow passes into a flow control valve 60, a duct 61, and finally to the air load 62. Through the duct 54, the air flows into a flow control valve 55, into a duct 56, past a temperature sensor 57, and then into the cabin 58. Through the regenerative valve 42, the air is routed into the first heat exchanger 23 to act as a coolant medium for the incoming water vapor bearing air, as described above.

In the event that it is desired to modulate the supply to either the cabin 58 and/or the air load 62, the flow control valves 55, 60 can be actuated to regulate the amount of the supply. The temperature of the supply can also be regulated by the flow control valve 65 which routes the bleed air 13 through the duct 18, a temperature control valve 52, and a duct 53 such that the bleed air 13 can be mixed into the supply. Additional modulation of the ECS 10 can be accomplished by allowing the bleed air 13 to flow into a duct 67 and through a flow control valve 66 in order to warm the second expanded air from the second turbine 38.

In again referring to FIG. 1, the liquid cycle subsystem 12 is a closed system and utilizes a liquid coolant, such as polyalphaolephin (PAO), to function as a coolant medium and as a heat source. The liquid coolant circulates through the subsystem 12 and changes its function as the heat exchange processes change, as further described below. With an arbitrary starting point, the pump 43 moves the liquid coolant through a piping 44 for receipt by the fourth heat exchanger 45, which is a liquid-to-air heat exchanger. The heat exchange process therein between the liquid coolant and a fan air cools the liquid. Then, the cooled liquid flows to the second heat exchanger 33 by a piping 46. In the second heat exchanger 33, waste heat is rejected to the air cycle subsystem 11.

From the second heat exchanger 33, a further cooled liquid flows through a piping 47 and either through the third heat exchanger 40 or a piping 48 and a bypass valve 49. In the third heat exchanger 40, the liquid rejects additional waste heat (although minimal in amount) to the second expanded air from the second turbine 38, thereby further cooling the liquid. This further cooled liquid exits the third heat exchanger 40 via a piping 50, passes a temperature sensor 63, and flows into the liquid load 51 for cooling. The temperature sensor 63, as well as the temperature sensor 57, provides temperature data to a controller 64 that actuates the variable nozzle 36 upstream of the second turbine 38.

It can be appreciated that the present invention achieves a reduction in system size over previous air cycle cooling systems. As mentioned above, for example, extracting water downstream of the first turbine 29 allows for the elimination of a large condenser. The 2-stage expansion technique allows the system 10 to reduce bleed air 13 consumption by processing the air 13 in multiple steps. On the other hand, in the conventional ECS with high pressure water separation, high pressure bleed air expands once in the turbine. The bleed air usage is determined by the air demand of the cabin, the forced air cooled avionics, and the air needed to satisfy the liquid cooling demand. Generally, the bleed air usage is a function of the temperature gradient across the condenser and the load heat exchanger. The temperature gradient is the difference of the turbine discharge temperature and the cabin supply temperature. The turbine discharge temperature is dictated by the system back pressure and the cabin supply temperature is a design parameter. As can be seen, with a single stage turbine expansion, the bleed air usage is fixed by these two parameters. As the load increases or the turbine discharge temperature increases, in order to meet the same cabin supply temperature, more air is needed.

Unlike the conventional ECS, the present invention allows the air temperature at the discharge of the heat exchanger 33 to raise above the cabin supply limit and then expand to a lower temperature suitable for cabin supply in the second turbine 38. This process, expanding the air to absorb the load and expand again to meet supply temperature limit, allows the system 10 to use less flow to satisfy the same load. This approach was not mentioned or applied, for example, in U.S. Pat. No. 5,086,622. In that patent, the bleed air flow was determined by the system demand in the form of fresh air supply to a cabin and it was designed to satisfy passenger comfort.

In still referring to the present invention, a condenser upstream of a first turbine, such as in U.S. Pat. No. 5,086,622, is of little value at high altitude operation where there is little water in the ambient air. Thus, at high altitude, the condenser results in wasted fuel consumption. On the other hand, the second heat exchanger 33 in the present invention remains useful even at high altitudes. Additionally, and as a result of ambient conditions, the first turbine in U.S. Pat. No. 5,086,622 is not used during flight and, thus, constitutes merely wasted fuel consumption. In contrast, the first turbine 29 in the present invention is used during flight to generate cooling air. Further, the particular use of a reheater and two turbines in the present invention allows for a balanced load between the turbines, thereby allowing the two turbines 29, 38 to operate at all times. Furthermore, the present invention recovers the wasted heat from the liquid cycle subsystem so that such heat may be converted to useful energy.

It should be understood, of course, that the foregoing relates to preferred embodiments of the invention and that modifications may be made without departing from the spirit and scope of the invention as set forth in the following claims.

We claim:

1. A method of conditioning water vapor bearing compressed air for supply as conditioned air, comprising the steps of:

providing an air cycle subsystem comprising a first heat exchanger, a reheater downstream of said first heat exchanger such that said reheater can reheat a dehumidified air, a first turbine that condenses said water vapor and is downstream of said reheater, a water extractor downstream of said first turbine, a second heat exchanger downstream of said water extractor, and a second turbine downstream of said second heat exchanger; and placing a liquid cycle subsystem in heat exchange relationship with said air cycle subsystem, said heat exchange relationship occurring at said second heat exchanger such that said air cycle subsystem can recover thermal energy from said liquid cycle subsystem.

2. The method of claim 1, wherein said air cycle subsystem further comprises a third heat exchanger downstream of said second turbine.

3. The method of claim 2, wherein said heat exchange relationship occurs at said third heat exchanger.

4. The method of claim 3, wherein said second and third heat exchangers are liquid-to-air heat exchangers.

5. The method of claim 3, wherein said liquid cycle subsystem comprises said second and third heat exchangers.

6. The method of claim 1, wherein said dehumidified air is produced by said water extractor.

7. The method of claim 1, wherein said reheater is intermediate said first heat exchanger and second turbine.

8. A method of conditioning water vapor bearing air for supply as conditioned air and cooling a liquid load, comprising the steps of:

providing an air cycle subsystem comprising a first heat exchanger, a reheater downstream of said first heat exchanger, a first turbine that condenses substantially all of said water vapor and is downstream of said reheater, a second heat exchanger downstream of said first turbine, a second turbine downstream of said second heat exchanger, and a third heat exchanger downstream of said second turbine;

extracting condensed water vapor from said water vapor bearing air, said step of extracting occurring in a water extractor intermediate said first turbine and second heat exchanger; and placing a liquid cycle subsystem in heat exchange relationship with said air cycle subsystem, said heat exchange relationship occurring at said second and third heat exchangers, whereby said second turbine can convert thermal energy from said liquid cycle subsystem into useful work.

9. The method of claim 8, wherein a liquid output from said third heat exchanger cools said liquid load.

10. The method of claim 8, further comprising the step of absorbing thermal energy from said liquid cycle subsystem, said step of absorbing occurring in said second heat exchanger.

11. The method of claim 8, further comprising the step of reheating a dehumidified air, said step of reheating occurring in said reheater.

12. The method of claim 8, further comprising the step of expanding a reheated air from said reheater, said step of expanding occurring in said second turbine.

13. The method of claim 8, further comprising the step of cooling said water vapor bearing air in said first heat exchanger.

14. The method of claim 8, further comprising the step of compressing said water vapor bearing air in a compressor upstream of said first heat exchanger.

15. A liquid-to-air cycle system for conditioning water vapor bearing air, comprising:

an air cycle subsystem comprising a reheater that can reheat a dehumidified air, a first turbine downstream of said reheater, a first liquid-to-air heat exchanger downstream of said first turbine, a water extractor intermediate said first turbine and first liquid-to-air heat exchanger, and a second turbine downstream of said reheater and first liquid-to-air heat exchanger; and a liquid cycle subsystem in heat exchange relationship with said first liquid-to-air heat exchanger, whereby said first liquid-to-air heat exchanger can absorb thermal energy from said liquid cycle subsystem and provide a recovered thermal energy for use by said second turbine.

16. The system of claim 15, wherein said air cycle subsystem further comprises a first air-to-air heat exchanger upstream of said reheater.

17. The system of claim 15, wherein said liquid cycle subsystem comprises said first liquid-to-air heat exchanger and a second liquid-to-air heat exchanger downstream of said first liquid-to-air heat exchanger.

18. A liquid-to-air cycle system for conditioning water vapor bearing air and cooling a liquid load, comprising:

an air cycle subsystem comprising a first air-to-air heat exchanger, reheater downstream of said first air-to-air heat exchanger, a first turbine downstream of said reheater, a first water extractor downstream of said first turbine, a first liquid-to-air heat exchanger downstream of said water extractor, and a second turbine downstream of said first liquid-to-air heat exchanger such that said second turbine can recover rejected heat from said first liquid-to-air heat exchanger; and a liquid cycle subsystem in heat exchange relationship with said air cycle subsystem at said first liquid-to-air heat exchanger such that said first liquid-to-air heat exchanger absorbs said rejected heat from said liquid cycle subsystem.

19. The system of claim 18, wherein said air cycle subsystem further comprises a second liquid-to-air heat exchanger downstream of said second turbine.

20. The system of claim 18, wherein said air cycle subsystem further comprises a variable nozzle intermediate said reheater and second turbine.

21. The system of claim 18, wherein said air cycle subsystem further comprises a second water extractor intermediate said reheater and first turbine.

22. The system of claim 23, wherein said air cycle subsystem further comprises a compressor upstream of said first air-to-air heat exchanger.

23. The system of claim 18, wherein said air cycle subsystem further comprises a primary heat exchanger and a secondary heat exchanger upstream of said first air-to-air heat exchanger.

24. The system of claim 18, wherein said liquid cycle subsystem comprises said first liquid-to-air heat exchanger and a second liquid-to-air heat exchanger downstream of said first liquid-to-air heat exchanger.

25. The system of claim 24, wherein said liquid cycle subsystem further comprises a pump intermediate said liquid load and first liquid-to-air heat exchanger.

26. The system of claim 24, wherein said liquid cycle subsystem further comprises a liquid-to-liquid heat exchanger upstream of said first liquid-to-air heat exchanger.

27. The system of claim 18, wherein said reheater reheats a dehumidified air.

28. The system of claim 18, wherein said first turbine condenses substantially all of said water vapor.

29. The system of claim 18, wherein a discharge air from said first turbine is at a discharge temperature above freezing for said water vapor.

30. A method of conditioning water vapor bearing air for supply as conditioned air and cooling a liquid load, comprising the steps of:

providing an air cycle subsystem comprising a first heat exchanger, a reheater downstream of said first heat exchanger, a first turbine that condenses substantially all of said water vapor and is downstream of said reheater, a second heat exchanger downstream of said first turbine, a second turbine downstream of said second heat exchanger, and a third heat exchanger downstream of said second turbine;

heating an outlet air from said second turbine, the step of heating occurring in said third heat exchanger; and placing a liquid cycle subsystem in heat exchange relationship with said air cycle subsystem, said heat exchange relationship occurring at said second and third heat exchangers, whereby said second turbine can convert thermal energy from said liquid cycle subsystem into useful work.

31. The method of claim 30 wherein a liquid output from said third heat exchanger cools said liquid load.

32. The method of claim 30, further comprising the step of extracting condensed water vapor from said water vapor bearing air, said step of extracting occurring in a water extractor intermediate said first turbine and second heat exchanger.

33. The method of claim 30, further comprising the step of absorbing thermal energy from said liquid cycle subsystem, said step of absorbing occurring in said second heat exchanger.

34. The method of claim 30, further comprising the step of reheating a dehumidified air, said step of reheating occurring in said reheater.

35. The method of claim 30, further comprising the step of cooling said water vapor bearing air in said first heat exchanger.

36. The method of claim 30, further comprising the step of compressing said water vapor bearing air in a compressor upstream of said first heat exchanger.

37. A liquid-to-air cycle system for conditioning water vapor bearing air, comprising:

an air cycle subsystem comprising a reheater that can reheat a dehumidified air, a first turbine downstream of said reheater, a first liquid-to-air heat exchanger downstream of said first turbine, a second turbine downstream of said reheater and first liquid-to-air heat exchanger, and a second liquid-to-air heat exchanger downstream of said second turbine; and a liquid cycle subsystem in heat exchange relationship with said first liquid-to-air heat exchanger, whereby said first liquid-to-air heat exchanger can absorb thermal energy from said liquid cycle subsystem and provide a recovered thermal energy for use by said second turbine.

38. The system of claim 37, wherein said air cycle subsystem further comprises a first air-to-air heat exchanger upstream of said reheater.

39. The system of claim 37, wherein said air cycle subsystem further comprises a water extractor intermediate said first turbine and first liquid-to-air heat exchanger.

40. The system of claim 37, wherein said liquid cycle subsystem comprises said first liquid-to-air heat exchanger and a second liquid-to-air heat exchanger downstream of said first liquid-to-air heat exchanger.

* * * * *